United States Patent [19]
Harriman

[11] Patent Number: 5,367,333
[45] Date of Patent: Nov. 22, 1994

[54] PASSIVE RANGE MEASUREMENT SYSTEM

[75] Inventor: Walter L. Harriman, Riverton, N.J.

[73] Assignee: The United States of America as represented by the Secretary of the Navy, Washington, D.C.

[21] Appl. No.: 921,863

[22] Filed: Jul. 27, 1992

[51] Int. Cl.$^5$ .............................................. H04N 7/18
[52] U.S. Cl. .................................. 348/117; 340/971; 348/140; 348/169
[58] Field of Search ................ 358/125, 126, 107, 103; 340/971; 348/117, 140, 169; H04N 7/18

[56] References Cited

U.S. PATENT DOCUMENTS

| | | | |
|---|---|---|---|
| 3,162,103 | 12/1964 | Perkins . | |
| 3,699,310 | 10/1972 | Cole | 89/1.5 E |
| 4,983,033 | 1/1991 | Suzuki | 356/4 |
| 5,001,508 | 3/1991 | Ogawa | 354/403 |
| 5,060,004 | 10/1991 | Ikuta | 354/403 |
| 5,177,462 | 1/1993 | Kajiwara | 358/125 |
| 5,216,480 | 6/1993 | Kaneko | 358/126 |

Primary Examiner—Howard W. Britton
Attorney, Agent, or Firm—James V. Tura; James B. Bechtel; Susan E. Verona

[57] ABSTRACT

A method and apparatus provides instantaneous passive range measurement onboard an aircraft for determining the range between the aircraft and a target. The target may either be stationary and on the earth's surface, or a slower moving vehicle. Calculation of the desired range is achieved using the formula: Range=[Sin a/Sin b] V; where "a"=angle from aircraft heading to target, "b"=turning rate; and "V"=ground velocity. The apparatus consists of an automatic video tracker, a video camera, and a servo controlled aiming platform. A resolver on the aiming platform is utilized to determine the angle from the aircraft axis to the target. This angle is added to the aircraft drift angle to determine the total angle from the aircraft heading to the target. The video tracker is utilized to determine the turning rate of the aiming platform. Using the difference in contrast between the target and the background of the video scene, the tracker provides error signals (azimuth and elevation) to keep the aiming platform pointed at the target. The azimuth error signal determines the turning rate of the aiming platform. The total turning rate is determined by adding the aiming platform turning rate to the aircraft turning rate obtained from the aircraft inertial system.

7 Claims, 2 Drawing Sheets

PASSIVE RANGE MEASUREMENT SYSTEM

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to range measurement systems. More specifically, this invention relates to an aircraft onboard range measurement system for measuring distances between the aircraft and other objects moving or stationary.

BACKGROUND OF THE INVENTION

Various systems and methods for determining the range between an aircraft and an object, usually a bombing target, are well-known. These systems fall into two basic categories, active and passive. Active range-finding systems, such as radar and laser emission and detection, are considered "active systems" since they require the transmission of energy. On the contrary, "passive systems" require no such transmissions and are preferred, because it is often desired to make range measurements without the possibility of detection or interfering with other aircraft transmissions and communications.

In the past, range measurement by passive systems has been achieved using triangulation. This requires measuring the angle to the object of interest from two positions spaced a known distance. One problem with aircraft-mounted systems of this type is that the two positions must be relatively close and, hence, the accuracy of measuring long ranges is inadequate. Furthermore, this system requires added complexity since the measurements must be taken from two separate reference points, each of which must be stabilized with regard to the aircraft.

The video tracker makes use of the difference in contrast between the target and the background of a video scene to provide error signals. The error signals are sent to a servo controlled aiming platform. The aiming platform moves in the direction required to reduce the error to zero. This keeps the aiming platform pointed at the target and the target positioned at the center of the video scene. It has, therefore, been recognized that the turning rate of the stabilized aiming platform is proportional to the error signal from the video tracker and the turning rate with regard to the target object can easily be determined.

There have been prior uses of automatic video trackers for supplying turning rate information to determine proper ordnance release; however, these have included extremely complicated systems in which range measurement was not required or desired. Such a prior use is described in U.S. Pat. No. 3,699,310 issued to Roy D. Cole, entitled "Angular Rate Bombing System".

The most pertinent other patent prior art of which the applicant is aware includes U.S. Pat. No. 3,162,103 issued to James M. Perkins, entitled "Photographic Method for Locating Objects that Drift at Sea"; U.S. Pat. No. 4,983,033 issued to Koji Suzuki, entitled "Automatic Range Finder for Camera"; U.S. Pat. No. 5,001,508 issued to Kimiski Ogawa, entitled "Range Finder"; and U.S. Pat. No. 5,060,004 issued to Kiyoshi Ikuta, entitled "Distance Measuring Device". These additional prior art references are pertinent to the present invention in that they show various range-finding systems. However, none shows the use of an automatic video tracker or use on an air vehicle for determining a range to ground objects or other slower moving vehicles.

SUMMARY OF THE INVENTION

The purpose of this invention is to provide a passive means for measuring range using automatic video tracking techniques. The primary application is for the Tactical Optical Surveillance System (TOSS), the C-Ranger, and similar systems. These systems are used aboard surveillance aircraft. Range information is needed for camera focusing and for determining the size of the targets. Active range sensors cannot be used and, hence, the present invention is appropriate because it is passive and the range measurement it provides is instantaneous.

The key element of the present device and range measurement method is the Automatic Video Tracker (AVT). As mentioned above, the AVT holds a selected target at the center of the video frame by sending horizontal and vertical error signals through a servo system which aims the platform. In the servo system, the horizontal error signal from the AVT is proportional to the angular turning rate of the aiming platform.

The camera aiming platform is arranged to point out the side of the air vehicle with viewing angles that vary in azimuth and elevation. Passive range from an air vehicle to a target can be determined from the following equation:

$$R = [\sin\theta / \sin(TA + TP)] V$$

WHERE:
R = Range
$\theta$ = Angle to the target relative to air vehicle heading
V = Air Vehicle ground velocity
TA = Air Vehicle turning rate
TP = Aiming Platform turning rate It can be seen that the above equation requires only the determination of a few variables and it is therefore easy to calculate and accurate. The aircraft drift angle, turning rate, and velocity can be obtained from the existing aircraft inertial systems which contain that information. Since the turning angle rates are used, and not the turning angles, range can be calculated instantaneously using the formula. This system is also completely passive because it emits no energy transmissions of any kind and operates solely on the reception of light which is reflected from the target.

The invention may be more particularly described as an onboard passive range calculator for an aircraft to determine the distance between the aircraft and a target, comprising: an airborne aircraft having a heading and a turning rate relative to a target, and a velocity relative to the ground; sensor means on the aircraft for determining the heading, turning rate and velocity; and a calculator connected to the sensor means for determining the range between the aircraft and the target according to the above-described formula. The turning rate sensor means comprises an automatic video tracker providing error signals to a gyro-stabilized aiming platform, and an inertial aircraft turning rate sensor. The turning rate value employed in the range formula is the total turning rate which is determined by adding the aiming platform turning rate to the aircraft turning rate supplied by the inertial sensor. The aiming platform turning rate may be determined by the azimuth error signal from the video tracker. The aircraft heading relative to the target is determined by the aiming platform azimuth resolver which should be added to the aircraft drift angle to determine the true heading, or the value used in the range formula.

It is, therefore, the main object of the present invention to devise an air vehicle based passive range measurement system which is reliable and accurate.

It is a further object of the present invention to provide such an aircraft range measurement system which is instantaneous and which can be measured automatically without the need for operator input.

It is yet another object of the present invention to achieve passive range measurement between an aircraft and a target utilizing information obtained from the aiming platform and an automatic video tracker mounted on the aircraft.

Other objects and advantages of the present invention will be readily apparent to those of ordinary skill in the art from the following drawings and description of the preferred embodiment.

DESCRIPTION OF THE PREFERRED EMBODIMENT

The present invention utilizes the basic equation for determining range as follows:

$$R = [\sin \theta / \sin (TA + TP)] V$$

Figure 1:
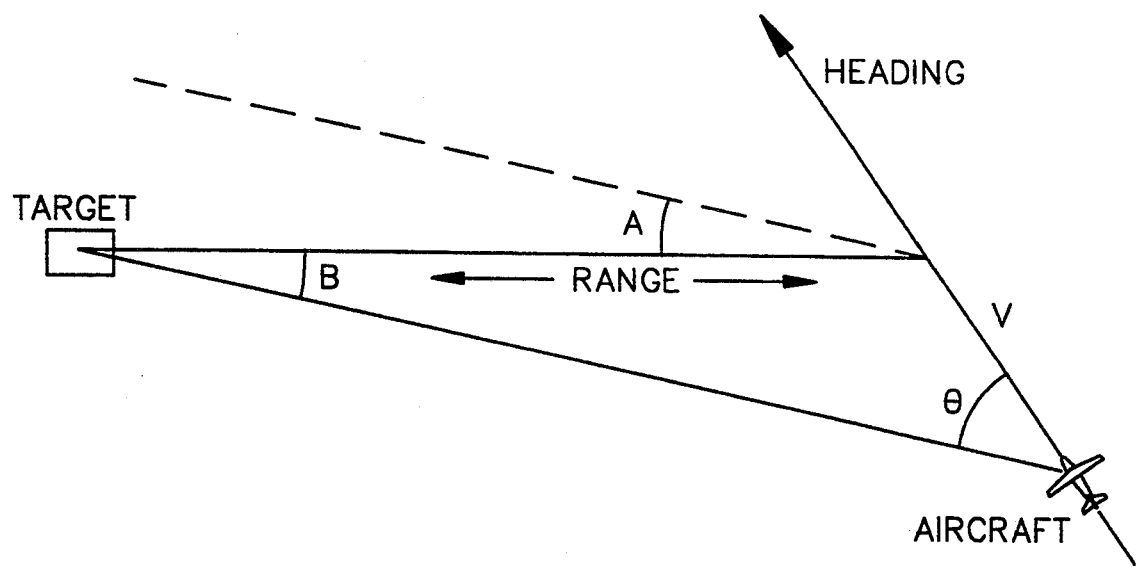
FIG. 1 is a diagram which shows how the range is calculated with the present invention between an aircraft and a given target.

The derivation of this equation is as follows. Referring now to FIG. 1, a random relationship between an air vehicle and a given target is shown. In this case, the aiming platform onboard the aircraft points out the left side the air vehicle. The equation may be derived by the following steps:

(1) In FIG. 1, line V represent the Velocity of the Air Vehicle. (The distance the air vehicle travels in one unit of time.)
(2) The angle '$\theta$' represents the angle measured from the heading of the air vehicle to the target.
(3) The angle A represents the total turning rate (TA+TP). The sum of the air vehicle and the aiming platform turning rates.
(4) Angles A and B are equal and opposite angles.
(5) From the triangle formed in FIG. 1, the angles '0' and 'B' and the one side 'V' are known values. Therefore, from the Law of Sines for triangles; Range/Sin $\theta$=V/Sin B and Range=(Sin $\theta$/Sin B)V Angle B is equal to angle A which is the total turning rate (TA+TP)

Therefore:

$$Range = [\sin \theta / \sin (TA + TP)] V$$

Figure 2:
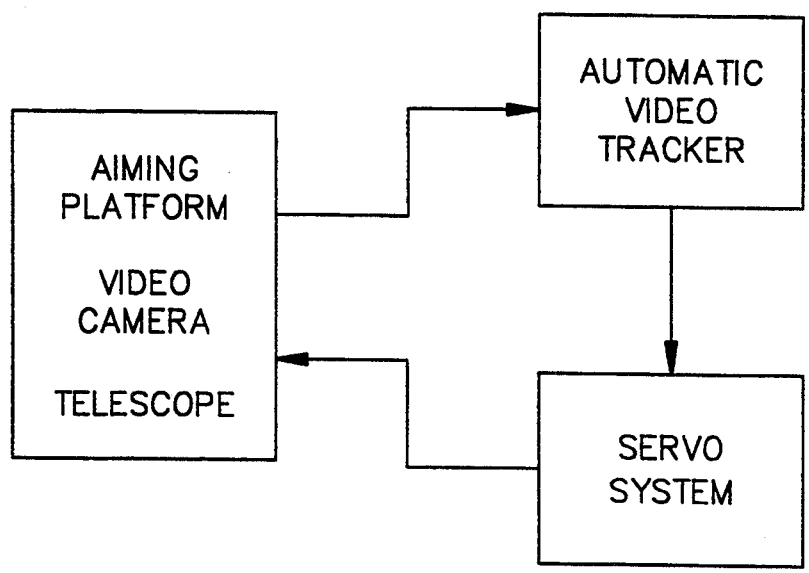
FIG. 2 is a diagram showing a prior art automatic video tracker optical system.

In the preferred embodiment, the Passive Range Measurement method of the present invention is used in conjunction with optical systems aboard an aircraft. A typical optical system is shown in FIG. 2. In this example, a conventional video camera and a telescope for long distance viewing are used.

The aiming platform includes a gyro stabilized gimbal to isolate the optics from aircraft motion. Also, resolvers are included for measuring the azimuth and elevation angles to the target relative to the axis of the aircraft.

The scene viewed by the camera can be selected manually with a joystick. When the desired target is acquired, the operator can switch to the automatic tracking mode. This holds the camera on the target and keeps the target at the center of the video scene no matter how the target or background is moving relative to the aircraft motion. This is true as long as the aiming platform remains within its range of motion. The automatic video tracker receives the video signal and provides error signals to the servo system to maintain target tracking. The automatic video tracker of the preferred embodiment is a system sold under the name "IDT 2000 Automatic Video Tracker" sold by Octec Ltd., GTR House, Milbanke Way, Bracknell, Berkshire RG12 1RP, England.

Figure 3:
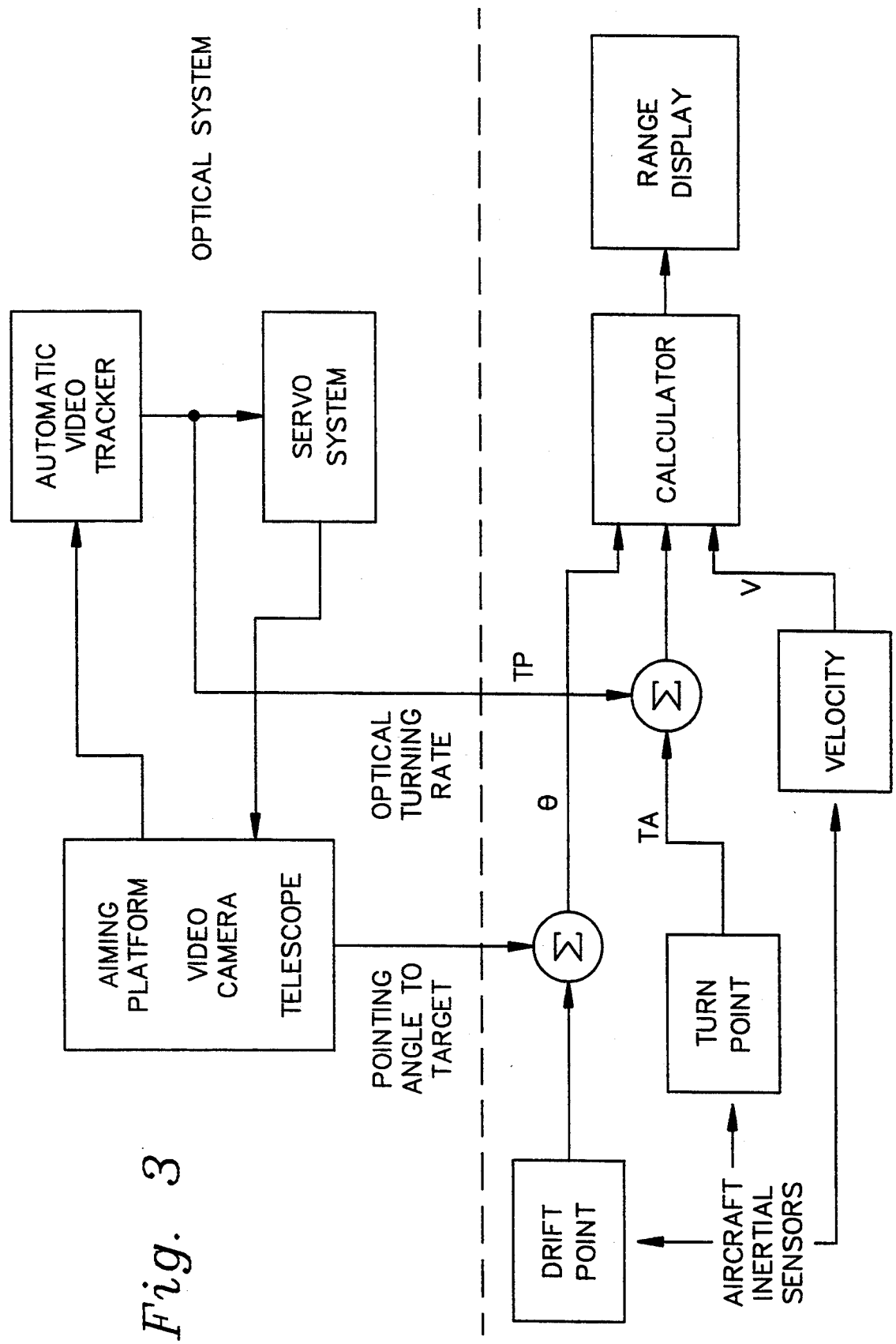
FIG. 3 is a diagram showing the range measurement calculator of the present invention and how it is connected to the automatic video tracker optical system and existing aircraft flight information.

The integration of the Passive Range Measurement system of the present invention into a typical optical system is shown in FIG. 3. Note that the range measurement system is shown on the bottom half of FIG. 3. The optical system is shown on the top half of FIG. 3. The pointing angle of the optical system relative to the aircraft axis is available from the azimuth resolver on the aiming platform. This variable must be added algebraically to the drift angle ($\theta$) to the target relative to the aircraft heading.

The turning rate (TP) of the aiming platform is directly proporational to the error signal from the tracker. Only the azimuth turning rate is required. This variable can be obtained from the automatic video tracker as shown. It must be added algebraically to the aircraft turning rate (TA) to obtain the total turning rate (TA+TP). The aircraft velocity (V) relative to the earth's surface enters directly into the calculation satisfying the Range equation:

$$(Range) \; R = [\sin \theta / \sin (TA + TP)] V$$

The aircraft drift angle, turning rate, and velocity can be obtained from the aircraft inertial system. Signal conditioning and scaling may be required on each of the five inputs to the Range Measuring System.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An onboard device to determine the range between an aircraft and a target, using available turning rates, comprising:

an airborne aircraft having an optical system and aiming platform onboard and a heading and a platform turning rate relative to a target, and a velocity relative to the ground;

sensors on said aircraft for determining said heading and turning rate and said velocity, wherein said turning rate sensor comprises an automatic video tracker, a gyro-stabilized aiming platform aimed at said target mounted to said aircraft, and an inertial aircraft turning rate sensor; and a calculator connected to said sensors which computes (Sin a ÷ Sin b)V for determining the range between the aircraft and the target:

[Range=(Sin a/Sin b) $V$,]

WHERE:
a = Angle to the target relative to air vehicle heading
b = Total turning rate, and
V = Ground velocity.

2. The range calculator of claim 1, wherein said turning rate value is the total turning rate determined by adding the aiming platform turning rate to the aircraft turning rate supplied by said inertial sensor.

3. The range calculator of claim 2, wherein said angle to the target relative to the aircraft axis is determined by the output of the aiming platform azimuth resolver.

4. The range calculator of claim 3, further including means onboard said aircraft for determining the drift angle of the aircraft.

5. The range calculator of claim 4, wherein said computed value includes the aircraft drift angle which is added to the resolver azimuth angle to determine the true angle from the heading to the target.

6. The range calculator of claim 5, wherein said video tracker is Octec Model IDT 2000.

7. The method onboard an aircraft that passively measures the range between the aircraft and a target, using available turning rates, comprising the steps of:

determining the true angle from the heading of the aircraft to the target;

determining the total turning rate by using the error signal of an automatic video tracker onboard the aircraft to determine platform turning rate and adding said platform turning rate to the aircraft turning rate;

determining the velocity of the aircraft with respect to the ground; and calculating the range between the aircraft and the target according to the formula:

$Range = (Sin\ a \div Sin\ b)\ V$,

WHERE:
a = Angle to the target relative to air vehicle heading,
b = Total turning rate, and
V = Ground velocity.

* * * * *